United States Patent [19]

Bell et al.

[11] Patent Number: 4,900,640
[45] Date of Patent: Feb. 13, 1990

[54] LOW COEFFICIENT OF EXPANSION ALLOYS HAVING A THERMAL BARRIER

[75] Inventors: James A. E. Bell, Oakville, Canada; John J. deBarbadillo, Barboursville, W. Va.

[73] Assignee: Inco Limited, Toronto, Canada

[21] Appl. No.: 183,675

[22] Filed: Apr. 19, 1988

[51] Int. Cl.$^4$ .............................................. B32B 15/04
[52] U.S. Cl. .................................... 428/633; 428/678; 428/685
[58] Field of Search ............... 428/632, 633, 678, 681, 428/685; 427/34, 405, 419.2

[56] References Cited

U.S. PATENT DOCUMENTS

| | | | |
|---|---|---|---|
| 4,055,705 | 10/1977 | Stecura et al. | 428/633 |
| 4,248,940 | 2/1981 | Goward et al. | 428/633 |
| 4,255,495 | 3/1981 | Levine et al. | 428/632 |
| 4,335,190 | 8/1982 | Bill et al. | 428/623 |
| 4,485,151 | 11/1984 | Stecura | 428/633 |
| 4,535,033 | 8/1985 | Stecura | 428/633 |
| 4,576,874 | 3/1986 | Spengler et al. | 428/633 |

OTHER PUBLICATIONS

McKee, D W. et al., "Resistance of Thermal Barrier Ceramic Coatings to Hot Salt Corrosion", *Thin Solid Films*, 73 (1980), pp. 439–445.

"Thermal Barrier Coatings for Engine Applications" by J. A. Colwell, Battelle Columbus Division, MCIC-86-C2, Aug. 1986.

"Effect of Thermal Cycling On $ZrO_2$-$Y_2O_3$ Thermal Barrier Coatings" by G. McDonald and R. C. Hendricks, NASA Technical Memorandum 81480, Apr. 21-25, 1980 Conference.

"Failure Mechanisms of Thermal Barrier Coatings Exposed to Elevated Temperatures" by R. A. Miller and C. E. Lowell, Thin Solid Films, 95 (1982), pp. 265–273, Apr. 5-8, 1982.

"Optimization of the NiCrAl-Y/$ZrO_2$-$Y_2O_3$ Thermal Barrier System" by S. Stecura, NASA TM-86905, May 5-9, 1985.

"Ceramic-Coated Metals can Survive Contact with Hot Working Fluid" by S. R. Levine and R. A. Miller, Research and Development, Mar. 1984, 122-125 (pp. 279-282).

"Practical Aspects of Ultra-Thick Thermal Barrier Coatings" by D. H. Harris, Journal of Materials for Energy Systems, vol. 8, No. 3, Dec. 1986, pp. 267-272.

Primary Examiner—L. DeWayne Rutledge
Assistant Examiner—George Wyszomierski
Attorney, Agent, or Firm—Edward A. Steen; Francis J. Mulligan, Jr.

[57] ABSTRACT

A low coefficient of expansion alloy is coated with a thermal barrier coating having a low coefficient of expansion compatible with the alloy. The alloy, preferably a 900 series iron-base alloy, includes an oxidation resistant intermediate bond coating and a zirconia containing thermal barrier. An article of manufacture made from this material could be utilized in heat engines where close tolerances are mandated.

7 Claims, 1 Drawing Sheet

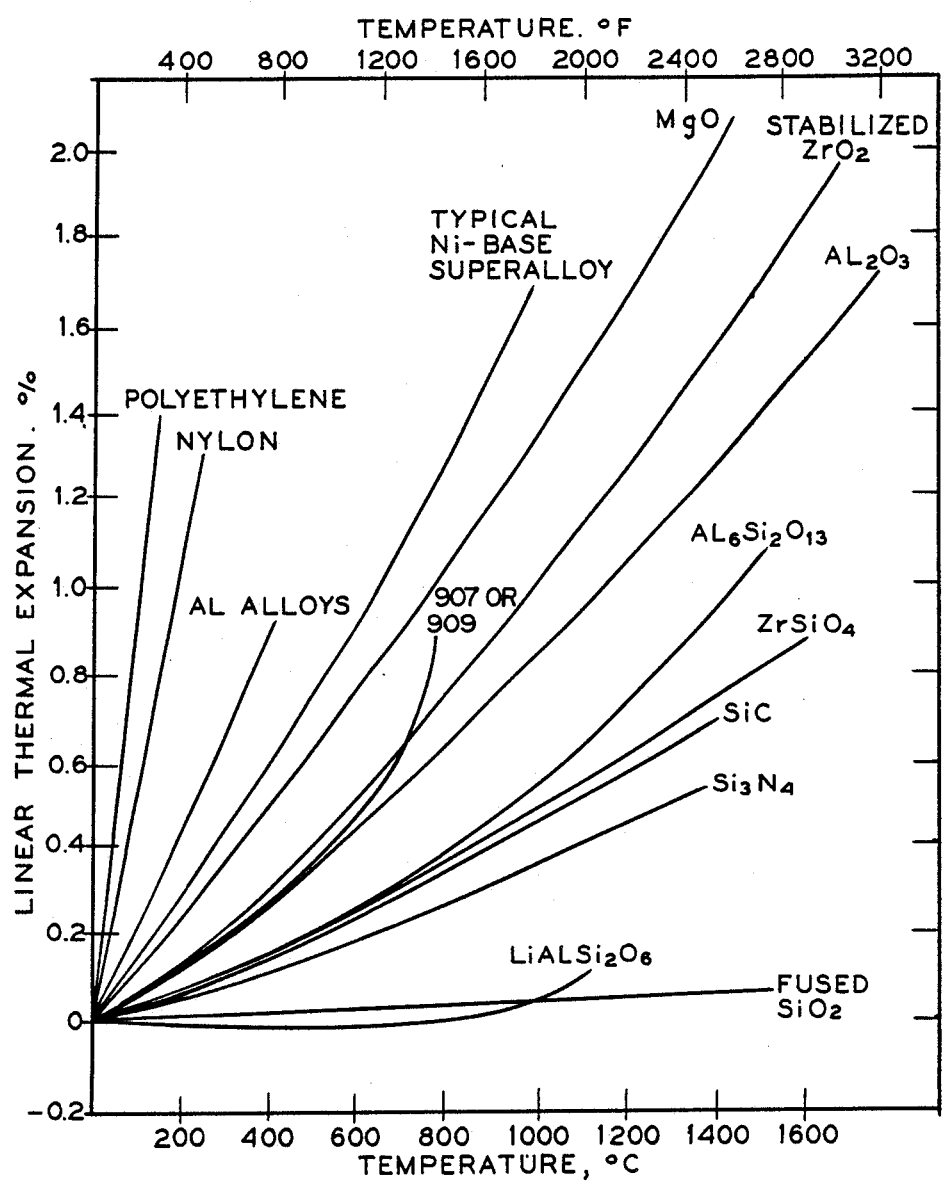

LOW COEFFICIENT OF EXPANSION ALLOYS HAVING A THERMAL BARRIER

TECHNICAL FIELD

The instant invention relates to a thermal barrier coating system in general, and more particularly, to a thermal barrier coating system for alloys having a low coefficient of expansion.

BACKGROUND ART

In order to increase the efficiency of heat engines, such as gas turbines and reciprocating engines, there usually must be a concomitant increase in the operating temperatures and pressures of these devices. Unfortunately, most current materials systems ultimately fail at elevated conditions thereby causing a practical limit on operating parameters.

Over the years various materials have been proposed and introduced to boost the operating temperatures and pressures of these engines. One common system includes the application of a thermal barrier coating ("TBC") including zirconia to a superalloy substrate. An intermediate oxidation resistant bond coating of MCrAlY is disposed between the TBC and the substrate.

The thermal expansion mismatch between conventional superalloys and their ceramic TBC's is partially accommodated by deliberately making the ceramic coating 10% porous. This is a half step at best. Under the circumstances, zirconia has been the material of choice since its coefficient of expansion is somewhat similar to those of the available nickel-base and cobalt-base superalloys now in production. In addition $ZrO_2$ has the lowest thermal conductivity of the common refractory materials. MgO and $Al_2O_3$ are not very suitable because their thermal conductivities are much greater than $ZrO_2$.

A difficulty with the available systems is that the superalloys have a moderate coefficient of expansion that must be taken into account when the internal components of the engines are fabricated. In jet aircraft engines, for example, turbines may reach temperatures of 1093° C. (2000° F.) and more. Although the refractory coating enables the superalloy to operate within such an environment serving as both a thermal barrier as well as an adjunct to the corrosion resistant properties of the alloy, the expansion of the superalloy substrate material may introduce certain inherent design inefficiencies in the engine. Close operating tolerances of the critical components are absolutely critical in turbine design.

As a result of the extreme conditions encountered in such power plants, low coefficient of expansion alloys have not been generally used in the more critical areas. Although possessing wonderfully low coefficient of expansion values which would allow increased engine component tolerances, these alloys generally do not exhibit the requisite high temperature and corrosion resistant characteristics as do the nickel-base and cobalt-base superalloys.

Low expansion cast and wrought alloys such as the 900 series of iron-base alloys are used for shafts, seals and shrouds in gas turbine engines where they are limited to components operating at 649° C. (1200° F.) or lower. This is because of the reduced oxidation resistance at this temperature and above. The problem is further compounded by the fact that at temperatures above about 649° C. (1200° F.) the alloys undergo phase changes that embrittle them. However, as discussed above, to improve engine efficiency through tighter sealing, gas turbine manufacturers would welcome the opportunity to extend the use of low expansion alloys to higher operating temperatures and pressures, but currently are stymied in view of the perceived shortcomings of the alloys.

There are numerous coating systems in the literature. U.S. Pat. Nos. 4,055,705; 4,248,940; 4,255,495; 4,485,151; 4,535,037; 4,375,190 are associated with refractories deposited on superalloy substrates.

SUMMARY OF THE INVENTION

Accordingly, there is provided a low expansion iron-base alloy having an oxidation resistant, thermal barrier duplex coating. A 900 series low expansion alloy includes a partially stabilized zirconia-yttria thermal barrier coating and an intermediate oxidation resistant coating.

The resultant system exhibits the necessary low expansion characteristics and superalloy properties while simultaneously providing satisfactory oxidation resistance. Articles of manufacture may withstand temperatures of about 871° C. (1600° F.). Higher temperatures may be withstood provided that air cooling is employed.

The thermal barrier coating has a very low thermal conductivity and a coefficient of expansion acceptably compatible to the cast and wrought low coefficient of expansion alloys in the expected temperature ranges. Although the anticipated internal operating temperatures may be higher than the results herein, the insulating characteristics of the thermal barrier will reduce the temperature of the substrate to acceptable levels.

BRIEF DESCRIPTION OF THE DRAWING

The FIGURE is a graphical depiction of the linear thermal expansion (in percent) of various materials versus temperature.

PREFERRED MODE FOR CARRYING OUT THE INVENTION

The ultimate thrust of the instant invention is the increased utilization of low coefficient of expansion iron-base alloys in heat engines. By applying the refractory thermal barrier and the intermediate bond layer to the alloy, the alloy's low expansion characteristics may be used to great advantage. The thermal barrier, preferably a partially stabilized zirconia ("PSZ"-8% $Y_2O_3$-$ZrO_2$) fairly matches the coefficient of expansion of the substrate 900 series of alloys (903, 907 and 909) and is compatible therewith. By insulating the substrate from the high internal temperature ravages of the engine, the components made from the instant invention may permit closer manufacturing tolerances thereby resulting in greater operating efficiencies.

The 900 series of alloys nominally contain about 38% nickel, 13-15% cobalt, 3-4.5% niobium, 1.5% titanium, optional silicon and aluminum, small quantities of other materials depending on the formulation and the remainder essentially iron (42%). To achieve the low coefficient of expansion ("COE"), the chemistry is restricted. In particular, chromium and aluminum must be limited to levels normally less than contained in other classes of superalloys. Normally this will cause oxidation at elevated temperatures as well as a rise in the COE. However, by coating these materials, oxidation resistance is maintained and temperature stresses within the substrate are kept to acceptable levels.

In particular, the 900 series of iron-base alloys (available as INCOLOY ® alloys 903, 907 and 909 [trademark of assignee]) were developed to take advantage of their low COE. For example, the COE of alloy 909 is about 10.3 $\mu$m/m/° C. ($5.7 \times 10^{-6}$ in/in/° F.) at about 649° C. (1200° F.) whereas the nickel-base superalloys INCONEL ® alloy 718 (trademark of assignee), RE-NE' ® 41 (trademark of Teledyne Allvac) and WASPALOY ® (trademark of United Technologies Corp.) have a combined average COE of about 15.3 $\mu$m/m/° C. ($8.5 \times 10^{-6}$ in/in/° F.) at 649° C. (1200° F.) (about 48% higher than 909). Iron-base superalloy A-286 has a COE of about 17.6 $\mu$m/m/° C. ($9.8 \times 10^{-6}$ in/in/° F.) at 649° C. (1200° F.) (about 71% higher than 909).

The Figure provides a comparison between various materials. It should be noted that the low expansion 900 series of alloys (particularly 907 and 909) are closer to zirconia than the typical nickel-base (and iron- and cobalt-base) superalloys. For example, the COE's for alloys 907 and 909 at −18° to 93° C. (0°-200° F.) are about 8.0 $\mu$m/m/° C. ($4.46 \times 10^{-6}$ in/in/° F.). The COE of PSZ at this same temperature range is about 11.0 $\mu$m/m/° C. ($6.1 \times 10^{-6}$ in/in/° F.). The COE's of the PSZ at the temperature of interest are similar since they do not appreciably change.

The coatings may be applied to the substrate by techniques known and available to those in the art. Plasma spraying was utilized in obtaining the following data. A METCO ® 9MB plasma spray unit was employed. It should be appreciated, however, that the other suitable methods of applying the thermal barrier and intermediate bond coating are appropriate as well.

MCrAlY (M=Ni, Fe, Co, NiFe, NiCo or mixtures thereof) was preferentially selected for the bond coating since it is highly effective for essential oxidation resistance. MCrAl and MAl may also be utilized if the conditions are less demanding.

For the purposes of this specification a low COE is meant to be a value at least 25% lower than a corresponding nickel, iron or cobalt-base superalloy or an article of manufacture made therefrom at a given temperature.

Test specimens were prepared. In most instances low COE INCOLOY ® alloy 909 was the substrate alloy. For the purposes of comparison, INCONEL ® alloy 718 and INCOLOY ® alloy 800 were used for five substrates. The powders used for the intermediate bond coating were procured from commercial sources. Table I lists the compositions for the substrates and the intermediate bond coating.

TABLE I

| COMPOSITION OF SUBSTRATES AND INTERMEDIATE LAYERS | | | | | | | | | |
|---|---|---|---|---|---|---|---|---|---|
| Alloy Substrates | Ni | Co | Fe | Cr | Cb | Ti | Al | Si | Other |
| 909 | 38.2 | 13.0 | Bal. | — | 4.7 | 1.5 | 0.03 | 0.4 | — |
| 718 | 52.0 | 1.0 max. | Bal. | 19.0 | 5.2 | 0.8 | 0.5 | 0.35 max. | — |
| 800 | 32.0 | — | Bal. | 21.0 | — | 0.4 | 0.4 | 1.0 max. | — |
| Intermediate Layers | | | | | | | | | |
| Ni 211 | Bal. | — | — | 22.0 | — | — | 10.0 | — | 1Y |
| Fe 124 | — | — | Bal. | 24 | — | — | 8 | — | .5Y |
| Ni 963 | 60.0 | — | Bal. | 22.5 | — | — | 6.8 | — | — |

Tables II and III list the particulars of the specimens. Table II relates to the entire system, whereas Table III details three different thermal barrier coating compositions.

TABLE II

| COMPOSITION OF TEST PIN SERIES | | | | |
|---|---|---|---|---|
| Sample No. | 8% Y$_2$O$_3$—ZrO$_2$ microns (mils) | Type of PSZ Powder | Intermediate Layer microns (mils) | Type of Powder |
| 0 | 500 (20) | Sintered | 100 (4) | Ni 211 |
| 1 | 500 (20) | Fused | 100 (4) | Fe 124 |
| 2 | 500 (20) | Fused | 100 (4) | Fe 124 |
| 3 | 500 (20) | Fused | 100 (4) | Fe 124 |
| 4 | 500 (20) | Sintered | 100 (4) | Fe 124 |
| 5 | 500 (20) | Sintered | 100 (4) | Fe 124 |
| 6 | 500 (20) | Sintered | 100 (4) | Fe 124 |
| 7 | 500 (20) | Fused | 100 (4) | Ni 211 |
| 8 | 500 (20) | Fused | 100 (4) | Ni 211 |
| 9 | 500 (20) | Fused | 100 (4) | Ni 211 |
| 10 | 500 (20) | Sintered | 100 (4) | Ni 211 |
| 11 | 500 (20) | Sintered | 100 (4) | Ni 211 |
| 12* | 500 (20) | Sintered | 100 (4) | Ni 211 |
| 16** | 500 (20) | Fused | 10 (0.4) | Ni 963 |
| 19 | 500 (20) | Fused | 100 (4) | Ni 211 |
| 20 | 500 (20) | Fused | 100 (4) | Ni 211 |
| 21 | 500 (20) | Sintered | 100 (4) | Ni 211 |
| 22 | 1000 (40) | Sintered | 100 (4) | Ni 211 |
| 23 | 2000 (80) | Sintered | 100 (4) | Ni 211 |
| 30 | 500 (20) | Sintered | 200 (8) | Ni 211 |
| 31 | 1000 (40) | Sintered | 200 (8) | Ni 211 |
| 32 | 2000 (80) | Sintered | 200 (8) | Ni 211 |
| 37 | 1000 (40) | Sintered | 100 (4) | Ni 211 |
| 39 | 1000 (40) | Sintered | 200 (8) | Ni 211 |
| 42 | 1000 (40) | Sintered | 100 (4) | Ni 211 |

All domed pin substrates are INCOLOY ® alloy 909 (about 12.7 mm [0.5 in] diameter × 76.2 mm [3.0 in] long) except 19, 20, 37 and 38 which were INCONEL ® alloy 718 and 42 which was INCOLOY ® alloy 800.
*Pin #12 was machined to hollow (6.3 mm [0.25 in] diameter) the interior to the dome of the pin
**Intermediate layer was a plasma vapor coated deposition (PVD)

TABLE III

| COMPOSITION OF VARIOUS TYPES OF PARTIALLY STABILIZED ZIRCONIA MONOLITHS | | |
|---|---|---|
| Monolith No. | Composition | Type |
| M-2 | 8% Y$_2$O$_3$—ZrO$_2$ | Fused and crushed |
| M-5 | 8% Y$_2$O$_3$—ZrO$_2$ | Sintered and crushed |
| M-7 | 8% Y$_2$O$_3$—ZrO$_2$ | Spherodized |
| M-10 | 12% Y$_2$O$_3$—ZrO$_2$ | Fused and crushed |
| M-11 | 12% Y$_2$O$_3$—ZrO$_2$ | Fused and crushed |
| M-13 | 20% Y$_2$O$_3$—ZrO$_2$ | Fused and crushed |

The specimens were evaluated in a cyclic oxidation rig under a variety of conditions aimed at evaluating: (i) the comparative resistance to thermal fatigue (coating crack or spalling) in order to find the preferred coating system; (ii) the operating temperature below which failure does not occur and (iii) the temperature gradient across the thermal barrier coating.

The monoliths of Table III were made by spraying the various PSZ powders on a 12.5 mm (0.5 in) diameter ×76.2 mm (3 in) length copper substrate followed by acid dissolution of the copper.

The thermal cycling data from the specimens are presented by test run in Table IV. Each test run varied in thermal conditions and duration, consequently the data are reported by Test Run number (TR). The monoliths (second series of specimens) are described in Table V along with the distribution of phases in the as-received condition. Data from Table IV are presented in Table VI to show the effect of furnace temperature on the thermal cycle resistance of both types of PSZ (fused and sintered) coatings on FeCrAlY and NiCrAlY intermediate layers using an INCOLOY® alloy 909 substrate. Table VII summarizes the sustainable temperature gradient as measured at different operating temperatures and the thermal cycle history of air cooled (0.2 m$^3$/hr [8 ft$^3$/hr]) hollow pin 12. A more detailed sustainable temperature gradient versus environmental temperature is given in Table VIII for pin 12. These temperature values are not rounded. Table IX compares the thermal cycle resistance of sintered PSZ coating on Ni 211 intermediate layer on INCOLOY® alloy 909 versus INCONEL® alloy 718 substrates at two furnace temperatures. Table X shows the effect of sintered PSZ thickness on two thicknesses of Ni 211 intermediate layer of INCOLOY® alloy 909 at a furnace temperature of 1000° C. (1830° F.). Table XI presents the thermal cycle resistance of INCOLOY® alloy 909 substrate versus INCONEL® alloy 718 and INCOLOY® alloy 800 substrates at equivalent sintered PSZ coating and Ni 211 intermediate layer thicknesses at 1000° C. (1830° F.).

TABLE IV
THERMAL CYCLE RESISTANCE OF PSZ COATED PINS

TR 1

| Conditions | |
|---|---|
| Furnace temperature | 915° C. (1680° F.) |
| Temperature at Core of Pin in Furnace | 700° C. (1290° F.) |
| Temperature at Core of Pin out of Furnace | 205° C. (400° F.) |
| Cycle Times | 15 min. in furnace/ 5 min. out |

| Pin No. | Results |
|---|---|
| 0 | 4536 cycles (63 days) without failure. Metallographic sample taken and pin 0 restarted in TR 4. |

TR 2

| Conditions | |
|---|---|
| Furnace temperature | 900° C. (1650° F.) |
| Temperature at Core of Pin in Furnace | 820° C. (1510° F.) |
| Temperature at Core of Pin out of Furnace | 205° C. (400° F.) |
| Cycle Times | 30 min. in furnace/ 10 min. out |

| Pin No. | Results |
|---|---|
| 1 | Failed in 1152 cycles (32 days) with longitudinal cracks and peeling from exposed end. |
| 4 | Failed in 1260 cycles (35 days) similar to Pin 1. |
| 7 | Failed in 1260 cycles (35 days) minor longitudinal crack emanating from exposed end. |
| 10 | No failure after 1260 cycles (35 days) Pin 10 restarted in TR 4 |

TR 3

| Conditions | |
|---|---|
| Furnace temperature | 880° C. (1610° F.) |
| Temperature at Core of Pin with Air Flowing | 740° C. (1365° F.) |
| Temperature of Core of Pin without Air Flowing | 820° C. (1510° F.) |
| Temperature of Core of Pin with Air Flowing and Outside of Furnace | 70° C. (160° F.) |
| Cycle Times | 30 min. in furnace/10 min. out |

TABLE IV-continued
THERMAL CYCLE RESISTANCE OF PSZ COATED PINS

| Pin No. | Results |
|---|---|
| 12 (Air Cooled) | No failure after 1044 cycles (29 days) Pin 12 restarted in TR 6 |

TR 4 AND 5

| Conditions | |
|---|---|
| Furnace temperature | 900° C. (1650° F.) |
| Temperature at Core of Pin in Furnace | 820° C. (1510° F.) |
| Temperature at Core of Pin out of Furnace | 205° C. (400° F.) |
| Cycle Times | 15 min. in furnace/ 5 min. out |

| Pin No. | Results |
|---|---|
| 0 | 396 cycles then restarted in TR 6. |
| 10 | Failed after 324 cycles (9 days) with hairline longitudinal crack - total of 1584 cycles (TR 2 and TR 4). |
| 16 | Failed after 144 cycles (4 days) with extensive longitudinal cracks. |
| 19 (718 substrate) | Failed after 360 cycles (10 days). |

TR 6

| Conditions | |
|---|---|
| Furnace temperature | 1015° C. (1860° F.) |
| Temperature at Core of Pin in Furnace | 980° C. (1795° F.) |
| Temperature at Core of Pin out of Furnace | 135° C. (275° F.) |
| Temperature of Core of Pin 12 in Furnace | 910° C. (1670° F.) |
| Temperature of Core of Pin 12 outside Furnace | 70° C. (160° F.) |
| Cycle Times | 30 min. in furnace/ 10 min. out 1 |

| Pin No. | Results |
|---|---|
| 0 | Failed in 144 cycles (cracks at bottom) - total of 5076 cycles (TR's 1, 4 and 6). |
| 3 | Failed in 72 cycles (2 days) with longitudinal cracks. |
| 5 | Slight peeling at bottom after 216 cycles (6 days) - restarted Pin 5 in TR 7. |
| 9 | Failed in 72 cycles (2 days) with longitudinal cracks. |
| 11 | Ran 216 cycles (6 days) with no failure - restarted Pin 11 in TR 7. |
| 17 | Failed in 7 cycles (0.2 day) with massive spalling at PSZ coating. |
| 20 (718 substrate) | Failed at 72 cycles (2 days) with crack on dome. |
| 12 (Air Cooled) | No failure in 144 cycles (4 days) - restarted Pin 12 in TR 7. |

TR 7

| Conditions | |
|---|---|
| Furnace temperature | 650° C. (1200° F.) |
| Temperature at Core of Pin in Furnace | 640° C. (1185° F.) |
| Temperature at Core of Pin out of Furnace | 205° C. (400° F.) |
| Temperature of Core of Pin 12 in Furnace | 490° C. (900° F.) |
| Temperature of Core of Pin 12 out of Furnace | 70° C. (160° F.) |
| Cycle Times | 30 min. in furnace/10 min. out |

| Pin No. | Results |
|---|---|
| 2 | No failure after 1877 cycles (52 days). |
| 5 | Failed after 390 cycles (11 days) with cracks on dome and bottom area (plus 216 cycles (6 days) in TR 6. |
| 6 | No failure after 1877 cycles (52 days). |
| 8 | No failure after 1877 cycles (52 days). |
| 11 | No failure after 1877 cycles (52 days) plus 216 cycles (6 days) in TR 6. |
| 12 (Air Cooled) | Cracks on dome after 595 cycles (17 days). Cracks first observed at 390 cycles (11 days). Pin 12 had total 1783 cycles (50 days) in TR's 3, 4, 6 and 7. Pin 12 restarted in TR 6 |

TR 4 AND 5 COMBINED

| Conditions | |
|---|---|
| Furnace temperature | 900° C. (1650° F.) |

TABLE IV-continued

THERMAL CYCLE RESISTANCE OF PSZ COATED PINS

| | |
|---|---|
| Temperature at Core of Pin in Furnace | 820° C. (1510° F.) |
| Temperature at Core of Pin out of Furnace | 205° C. (400° F.) |
| Cycle Times | 15 min. in furnace/ 5 min. out |

TR 8

| Conditions | |
|---|---|
| Furnace temperature | 1000° C. (1830° F.) |
| Temperature at Core of Pin in Furnace | 994° C. (1830° F.) |
| Temperature at Core of Pin out of Furnace | 205° C. (400° F.) |
| Cycle Times | 60 min. in furnace/ 10 min. out |

| Pin No. | Results |
|---|---|
| 21 | No failure after 750 cycles (36 days). |
| 22 | Crack on dome at 190 cycles (9 days) (no propagating after 750 cycles [36 days]). |
| 23 | Failed at 25 cycles (1 day). |
| 30 | No failure after 750 cycles (36 days). |
| 31 | Failed at 40 cycles (2 days). |
| 32 | Failed at 25 cycles (1 day). |
| 37 (718 substrate) | Failed at 41 cycles (2 days). |
| 39 (718 substrate) | Failed at 21 cycles (1 day). |
| 42 (800 substrate) | Failed at 39 cycles (2 days). |

TABLE V

PHASE IDENTIFICATION OF PLASMA SPRAYED MONOLITHS

| Monolith No. | Type PSZ | Tetragonal | FCC | Monoclinic |
|---|---|---|---|---|
| M-2 | 8% $Y_2O_3$ PSZ-Fused | 100% | — | — |
| M-5 | 8% $Y_2O_3$ PSZ-Sintered | 100% | — | — |
| M-7 | 8% $Y_2O_3$ PSZ-Spheroidized | 100% | — | — |
| M-10 | 12% $Y_2O_3$ PSZ-Fused | 57% | 43% | — |
| M-11 | 12% $Y_2O_3$ PSZ-Fused | 41% | 59% | — |
| M-13 | 20% $Y_2O_3$ PSZ-Fused | — | 100% | — |

TABLE VI

EFFECT OF FURNACE TEMPERATURE ON THERMAL CYCLE RESISTANCE OF FUSED AND SINTERED PSZ COATINGS ON FeCrAlY AND NiCrAlY INTERMEDIATE LAYERS USING AN INCOLOY ® ALLOY 909 SUBSTRATE

| TBC Type | Intermediate Layer | Cycles @ 650° C. (1220° F.) | Cycles @ 910° C. (1670° F.) | Cycles @ 1015° C. (1860° F.) |
|---|---|---|---|---|
| Fused | Fe 124 | >1877 | 1052 | 72 |
| Sintered | Fe 124 | >1877 | 1186 | 208 |
| Fused | Ni 211 | >1877 | 1160 | 72 |
| Sintered | Ni 211 | >1877 | 5076 | 216* |

*Initially 360 cycles at 650° C. (1200° F.)

TABLE VII

HISTORY OF AIR COOLED (0.2 m³/hr [8 ft³/hr]) PIN #12

| TR | Furnace, °C. (°F.) | Core, °C. (°F.) | Difference, °C. (°F.) | # Cycles |
|---|---|---|---|---|
| 3 | 880 (1610) | 740 (1365) | 140 (245) | 1044 |
| 6 | 1015 (1860) | 910 (1670) | 105 (190) | 144 |
| 7 | 650 (1200) | 505 (940) | 145 (260) | 595 |

TABLE VIII

SUSTAINABLE TEMPERATURE GRADIENT EXPERIENCED BY PIN #12 VERSUS ENVIRONMENTAL TEMPERATURE USING INTERNAL AIR FLOW OF 0.2 m³/hr (8 ft³/hr)

| Furnace Temperature, °C. (°F.) | Core Temperature, °C. (°F.) | Difference, °C. (°F.) |
|---|---|---|
| 1019 (1866) | 916 (1680) | 103 (186) |
| 890 (1634) | 742 (1368) | 148 (266) |
| 809 (1488) | 650 (1202) | 159 (286) |
| 719 (1325) | 556 (1032) | 163 (293) |
| 604 (1120) | 440 (824) | 164 (296) |

TABLE IX

THERMAL CYCLE RESISTANCE OF SINTERED PSZ COATING ON NiCrAlY (Ni 211) INTERMEDIATE LAYER ON INCOLOY ® ALLOY 900 VERSUS INCONEL ® ALLOY 718 SUBSTRATES AT 900° C. (1650° F.) AND 1015° C. (1860° F.)

| Furnace Temperature, °C. (°F.) | Cycles to Failure Alloy 909 | Cycles to Failure Alloy 718 |
|---|---|---|
| 900 (1650) | 5076 | 360 |
| 1015 (1860) | 216* | 72 |

*360 cycles initially at 650° C. (1200° F.)

TABLE X

EFFECT OF SINTERED PSZ THICKNESS ON TWO THICKNESSES OF NiCrAlY (Ni 211) INTERMEDIATE LAYER ON INCOLOY ® ALLOY 909 AT FURNACE TEMPERATURE OF 1000° C. (1830° F.)

| Pin No. | Ni 211 Thickness microns (mils) | Sintered PSZ thickness, microns (mils) | Cycles to Failure |
|---|---|---|---|
| 21 | 100 (4) | 500 (20) | 700 |
| 22 | 100 (4) | 1000 (40) | 190 (minor crack on dome) |
| 23 | 100 (4) | 2000 (80) | 25 |
| 30 | 200 (8) | 500 (20) | 700 |
| 31 | 200 (8) | 1000 (40) | 40 |
| 32 | 200 (8) | 2000 (80) | 25 |

TABLE XI

COMPARISON OF THERMAL CYCLE RESISTANCE OF INCOLOY ® ALLOY 909 VERSUS INCONEL ® ALLOY 718 AND INCOLOY ® ALLOY 800 SUBSTRATES AT EQUIVALENT SINTERED PSZ COATING AND NiCrAlY (Ni 211) INTERMEDIATE LAYER THICKNESS AT 1000° C. (1830° F.)

| Pin No. | Substrate | Ni 211 thickness microns (mils) | Sintered PSZ thickness microns (mils) | Cycles to Failure |
|---|---|---|---|---|
| 22 | 909 | 100 (4) | 1000 (40) | 190 (minor crack on dome) |
| 37 | 718 | 100 (4) | 1000 (40) | 41 |
| 42 | 800 | 100 (4) | 1000 (40) | 39 |
| 31 | 909 | 200 (8) | 1000 (40) | 40 |
| 39 | 718 | 200 (8) | 1000 (40) | 21 |

The results demonstrate: (i) the compatibility of duplex PSZ coating with low COE alloys, particularly 909 and (ii) that duplex PSZ coated INCOLOY ® alloy 909 can be used in higher temperature environments than uncoated INCOLOY ® alloy 909. It has been additionally shown that thermal barrier coated INCOLOY ® alloy 909 as a composite system has greater thermal cycle resistance than does thermal barrier coated INCONEL ® alloy 718 or thermal barrier coated INCOLOY ® alloy 800. The instant system has been shown to tolerate at least up to 871° C. (1600° F.)

with an air flow of only 0.2 m³/hr (8 ft³/hr) for at least 5000 cycles. It outperformed an identically tested alloy 718 NiCrAlY bond coat/PSZ composite which failed in less than 400 cycles.

Table IV presents the thermal cycle resistance of the composite specimens tested under a variety of thermal cycle conditions. The tests were run in order to select a preferred type of 8% $Y_2O_3$-$ZrO_2$ (fused or sintered) and a preferred choice for MCrAlY intermediate layer (M=Ni or Fe). Additionally, four duplicate coated pins with INCONEL ® alloy 718 substrates were tested for comparative purposes with INCOLOY ® alloy 909. One plasma vapor deposited ("PVD") intermediate layer on INCOLOY ® alloy 909 was also evaluated. The results (Table VI) suggest that at temperatures near 910° C. (1670° F.) and above sintered PSZ is preferable to fused PSZ. The reason for the preferred performance is not yet known. Similarly as shown also in Table VI, the performance of the two intermediate layers (NiCrAlY and FeCrAlY) are equivalent at 650° C. (1220° F.). However, at 910° C. (1670° F.) and above, the NiCrAlY intermediate layer (Ni 211) is preferred over the FeCrAlY intermediate layer (Fe 124). Again, a reason for this result has yet to be established. Table X clearly shows the marked improvement in thermal cycle resistance that is achieved when INCOLOY ® alloy 909 is used as the substrate for a sintered PSZ coating (0.5 mm [0.02 in]) on a NiCrAlY (Ni 211) (0.1 mm [0.004 in]) intermediate layer over that of the duplicate coating on INCO alloy 718 (see Table XI for additional comparison with INCONEL ® alloy-718 and INCOLOY ® alloy 800). The PVD coating of Ni 963 was not roughened prior to either PVD or plasma spraying (of PSZ coating), consequently, the composite failed rapidly (Pin 16 in TR 4 and 5, data presented in Table IV).

The effect of PSZ coating thickness on thermal cycle resistance is shown in Table X using the pins described in Table II. The 0.5 mm (20 mils) coating is preferred over the thicker coating thicknesses. These same Tables (X and II) present data to suggest that there is essentially no difference in performance between 0.1 mm (4 mils) and 0.2 mm (8 mils) NiCrAlY intermediate layer thicknesses.

Zirconia undergoes a drastic phase change near 950° C. upon cooling which results in a 3.5% volume expansion. Additions of $Y_2O_3$ (6-8%) initially stabilize the high temperature tetragonal phase to much lower temperatures. Compositions near 12% $Y_2O_3$-$ZrO_2$ are 50% tetragonal - 50% FCC, while those near 20% $Y_2O_3$-$ZrO_2$ are totally FCC. This is confirmed in Table V for the monoliths of Table III. Note that the type of 8% $Y_2O_3$-$ZrO_2$ does not alter the phase distribution.

Pin #12 from Table II was machined with a 6.3 mm (0.25 in) drill to make a hole to the dome of the test pin and using a small diameter tube and laboratory compressed air at 0.2 m³/hr (8 ft³/hr), the pin was air cooled while being tested in TR's 3, 6 and 7. The sustained temperature gradient and number of thermal cycles at each test temperature are given in Table VIII and a profile of the sustainable temperature gradients from 604° C. (1120° F.) to 1019° C. (1866° F.) are given in Table IX. Note that the sustainable temperature gradient gradually decreases as the temperature increases for the 0.5 mm (0.02 in) PSZ coating. Nonetheless, air cooled engine components made from the materials disclosed herein appear to be acceptable and overcome the difficulties envisioned with conventional 900 series alloys.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An improved coated article of manufacture having a thermal barrier coating system including a substrate, an intermediate bond coating registered with the substrate, and a thermal barrier coating over the intermediate bond coating, the improvement comprising the substrate made from an iron-nickel containing alloy having a low linear coefficient of expansion of about 10 $\mu$m/m/° C. at about 649° C., the linear coefficient of expansion of the iron-nickel containing alloy approximating the linear coefficient of expansion of the thermal barrier coating.

2. The improved article according to claim 1 wherein the substrate is selected from the 900 series of low coefficient of expansion alloys.

3. The improved article according to claim 2 wherein the substrate includes about 38% nickel, about 13% cobalt, about 4.7 niobium, 1.5% titanium and about 42% iron.

4. The improved article according to claim 1 wherein the thermal barrier coating includes sintered 8% $Y_2O_3$-$ZrO_2$ having a microstructure consisting of a stable tetragonal phase.

5. The improved article according to claim 1 wherein the intermediate bond coating includes ZA1 wherein Z is selected from the group consisting of Ni, Fe, Co, Cr, Y, and mixtures thereof.

6. The improved article according to claim 1 including an air passage formed within the article for cooling the article.

7. The improved article according to claim 1 wherein the intermediate coating has a thickness of about 0.1 mm, and the thermal barrier coating has a thickness of about 0.5 mm.

* * * * *

UNITED STATES PATENT AND TRADEMARK OFFICE
CERTIFICATE OF CORRECTION

PATENT NO. : 4,900,640
DATED : FEBRUARY 13, 1990
INVENTOR(S) : JAMES A.E. BELL, JOHN J. deBARBADILLO

It is certified that error appears in the above-identified patent and that said Letters Patent is hereby corrected as shown below:

COVER PAGE [75] INVENTORS: "JAMES A.E. BELL, Oakville, Canada,
JOHN J. deBARBADILLO, Barboursville, W. Va."

should read:

--JAMES A.E. BELL, Oakville, Canada,
JOHN J. deBARBADILLO, Barboursville, W. Va.,
GAYLORD D. SMITH, Huntington, W. Va.-- as they appear on the filing receipt.

Signed and Sealed this

Twenty-ninth Day of January, 1991

Attest:

HARRY F. MANBECK, JR.

*Attesting Officer*  *Commissioner of Patents and Trademarks*